United States Patent Office 3,544,892
Patented Dec. 1, 1970

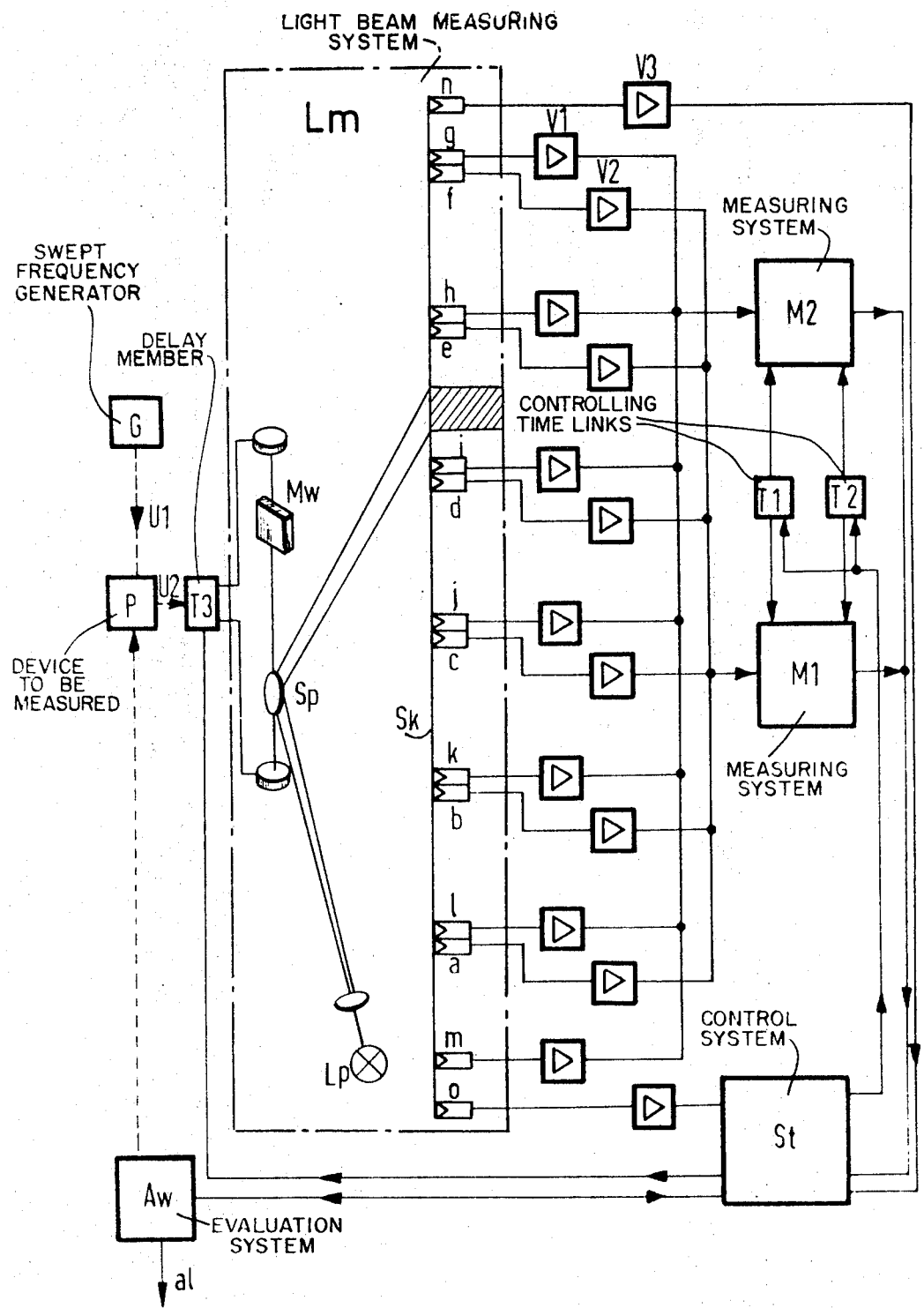

1

3,544,892
PHOTO-ELECTRIC APPARATUS FOR THE MEASUREMENT OF ELECTRICAL CHARACTERISTICS OF CIRCUIT DEVICES WHICH ARE SUPPLIED DURING THE MEASURING PERIOD WITH A VARYING ELECTRICAL SIGNAL
Erwin Martin, Munich, Germany, assignor to Siemens Aktiengesellschaft, Munich, Germany, a corporation of Germany
Filed Dec. 9, 1968, Ser. No. 782,182
Int. Cl. G01n 27/00, 13/38
U.S. Cl. 324—57
9 Claims

ABSTRACT OF THE DISCLOSURE

A system for measuring or classifying electric circuit devices which provide fluctuating outputs. The outputs are supplied to a photo electric measuring device employing a movable mirror which sweeps a light beam across a large number of photo elements. The photo elements are arranged in two different groups or classifications, the first group being employed to indicate the range of fluctuations of the output of the device being measured, and the second group of photo elements being employed to provide the digital value of the characteristic being measured.

GENERAL DESCRIPTION OF THE INVENTION

This invention concerns a circuit arrangement for measurement of the electrical characteristics of circuit devices which are supplied during the measuring procedure with periodically changing currents. Such devices may be those employed in the long distance communication art, such as filters or other four terminal devices. For example, in classification of filter elements, the devices being measured may be supplied with a voltage of periodically changing frequency, for determination of the characteristic being measured, during fluctuations in frequency, after termination of the time necessary for the system to get into an oscillating condition.

It is generally known that measurement values should not be read from measuring instruments which require a long time to begin fluctuations or oscillations, or instruments which have a long response time. Similarly, measurements used to determine the nature of processes which only slowly reach their final value, should not be read immediately upon connection of the measuring instrument to the device to be measured. Rather, any such reading should be made only after termination of the processes necessary to the oscillating condition. In processes which periodically repeat themselves, measuring devices which are themselves slow to respond, are used additionally to measure the mean, the effective, and other eletcrical values. Additionally, in apparatus not itself slow enough in response, the necessary slowness is frequently generated or increased by additional auxiliary systems.

However, if the measuring aparatus is just slow enough in response that it places itself on a mean value, but is not able to maintain it, the indicator of the apparatus swings around the means value between two constant

2 limiting values. This may happen, for instance, when the measuring value fluctuations are very high. The higher the fluctuation, the further apart are the limiting values between which the indicator swings.

It is in some instances required to measure the electrical value of a circuit device, which value has a position either within or outside of the limits of the fluctuations of the value around the mean value. It is known that such a measuring procedure can be carried out manually. In such case, the person who does the measuring, connects the circuit device to be measured in customary manner to the measuring device. He then reads the upper and/or the lower limiting value of the fluctuations, after a certain period of time. Then, depending upon the measuring instructions, he assigns to the circuit device one of the limiting values noted, or perhaps a value between the limiting values. If necessary, the item being measured can then be classified into a class of a a certain quality. This measuring procedure is tedious, requires careful attention by the measuring personnel, and still does not prevent errors in reading the measuring values in the case of the determination of the mean value of the characteristic being measured, or in classification of the circuit device.

It is an object of the present invention to provide a circuit arrangement for automatic measurement of electrical values subject to fluctuations. It is a further object to provide this function by apparatus which permits subsequent automatic classification of the circuit devices being measured.

A light beam measuring instrument often is used for measuring the analog values of electrical characteristics, and for emission of these values in digital form. Such an instrument can be used for automatic counting operations, and also for controlling purposes. For example, the prior art includes a light beam measuring instrument which, after an analog value is achieved, generates digital pulses upon return of the light beam indicator to the starting position, through interruption of the light beam by means of small mirrors. These pulses then control corresponding counters and are recorded if necessary. Though this measuring instrument is able to emit analog values in digital form, it is not possible with the instrument to measure values which fluctuate.

From the prior art it is also known that the mean value of a measurement can be arrived at by instantaneous determination of the value. Several measuring points can supply analog voltages over measuring magnitude transformers, for this purpose. A measuring point commutator then switches these voltages in time succession into an analog to digital converter, which provides a numerical output as the value being measured. In a separate limiting value supervision system, the measuring value can then be compared with one or more given limiting values. The excess of the limiting values by the value being measured, can then be printed, together with the date, the time and the number of the measuring point. The instant values are then received into a storage device for formation of the mean value. At the end of the measurement period, the arithmetical mean value of the measuring values is formed from the sum of the instant values and the number of scannings involved. This circuit arrangement is primarily suited for simultaneous measurement of several different objects. It is not intended for measurement of an individual circuit device which is subsequently to be classified into a certain group of the same type of switching devices. Moreover, only the mean value of several measuring objects can be determined with this apparatus, but not a value which lies at a point other than the mean value, such as between the limits or at the limits of the fluctuations of the value being measured.

The invention attains the object of measurement indicated hereinabove, by the use of several limiting value indicators employed in a digital measuring equipment for response to analog values of measurements. These several limiting value indicators subdivide the scale into several ranges and respond to the impingement thereon of the instrument indicator, or the passage thereover of the instrument indicator. The limiting value indicators are arranged in two classifications or groups. One classification is provided for the determination of the limits of the measuring value fluctuations. The other classification fixes the measuring value range, depending upon the limits of the fluctuations, and indicates the measuring value to be read for the digital value.

The apparatus of the invention has the advantage that the measurement of circuit devices can be carried out by that apparatus completely automatically, and that the result of measurement is obtained in a form which permits automatic further handling of the circuit device, as for example by a sorting system.

In the technique of the invention, the fluctuations of the value being measured around the mean value thereof are arrived at by detection of the limits of these fluctuations with the aid of limiting value indicators of a first group. These indicators can then operate control systems which block, release or actuate specified limiting value indicators of a second group, in order to indicate the position of the starting value, for digital indication.

By reason of the use of limiting value indicators for measurement of the value to be provided in digital form, in the first scale division, it is possible to change the position of the measuring value in simple manner as required. This has the advantage that no different apparatus is necessary for every change in designations between the measuring value and the limits of the fluctuations in measuring value.

DETAILED DESCRIPTION OF THE INVENTION

The invention will now be more fully described in conjunction with the accompanying drawing which schematically shows a preferred embodiment of the invention.

The circuit device to be measured and the input and output elements therefore are designated in the drawing by a block labelled P. This device may be, for instance, a filter or other four terminal network which supplies an output indicated by the symbol U2 in response to a changing input, such as a changing frequency U1 supplied by a generator G. If the circuit device being measured is a filter, the output U2 will be a voltage whose values are to be detected, as the frequency supplied by generator G periodically changes from a lower to an upper limiting value.

The output from the circuit device P is connected to a controllable delay device T3. The output of that device is in turn connected to the measuring element Mw of a light beam measuring instrument Lm. The measuring mechanism Mw controls the rotational position of a mirror, Sp, thereby controlling the position on a scale Sk of a light beam from a source Lp, reflected by the mirror onto the scale. The scale Sk is provided with a series of photo elements $a$ to $o$ and associated pulse amplifiers V1, V2, V3. . . . In a system of this kind the scale may be equipped with a large number of photo elements, for example 100, distributed at equal spacings along the length of the scale, and only the photo elements necessary for measurement may be employed. Moreover, the apparatus can be constructed so that the photo elements required for the particular measurement in question may be plugged in at the appropriate places on the scale where they are required. The drawing only shows a certain limited number of photo elements for the purpose of simplified explanation of the invention, and it will be apparent that a different number of photo elements than that shown may actually be used.

Depending on the measuring task which is to be performed by the apparatus, the entire scale Sk may be subdivided by the photo elements into as many ranges as required by the necessity for measuring accuracy.

As an illustration of the invention, the photo elements $a$ to $f$ may form a first classification or group while the photo elements $g$ to $m$ which produce digital outputs representative of the measured value may form a second group. In addition, the photo elements $o$ and $n$ provide limits for the lower and upper ends, respectively, of the scale. Though the groups can be of any relative size, in the example of the drawing, two groups of equal size are illustrated, so that photo elements of the respective groups are arranged in pairs. Photo diodes $a$ to $f$ which serve as limiting value detectors to determine the limits of the fluctuations of the measuring value, are connected with a measuring system M1, while the photo elements $g$ to $m$ are connected to the measuring system M2. The respective measuring systems M1 and M2 are controlled by time delay devices T1 and T2.

In operation of the system of the drawing, if a circuit device is introduced into the input and output terminals for the device to be examined P and connected to the apparatus thereof, the generator G is started, then the delay device T3 is energized. That device has a very long time constant. By reason of the slowness of response of the light beam measuring instrument Mw, still further increased by the delay in device T3, the time delay device T1 at the beginning holds both measuring systems M1 and M2 in rest positions. The light beam of the measuring apparatus then sets itself approximately to a mean value in the course of, for example, five periodic frequency changes.

When the light beam indicator leaves its starting position, the limit photo element 0 responds to the passage of the light beam over its surface, and notifies the control system St of this fact, by a pulse. The control system then supplies the time delay device T1 with a pulse, so that thereafter, for the time being, the processes of starting the oscillation of the light beam produce no signals from the remaining photodiodes because the activated device T1 acts to prevent passage of signals from the photodiodes to measuring circuits M1 and M2 so that the remaining photodiodes will, in effect, not be activated by light impinging thereon. Nevertheless, it will be noted that the photo diode $n$ is connected through the amplifier V3 directly to the control system St, so that this diode is not inhibited from giving a response if the light beam strikes it. If that should occur, an error indication would be supplied to the control system St. The apparatus is also designed so that an error indication is given if the photo element 0 is not struck by the light beam during the beginning of the measuring operation.

After the time delay provided by the device T1 has expired, the measuring system M1 is enabled to receive pulses arriving from the photo elements. Concurrently with measuring circuit M1 being enabled, time delay device T2 is provided with a pulse from control circuit St which causes T2 to be actuated to control the period of time during which M1 will observe the fluctuations of the light beam. While T1 and T2 are shown in the drawing as receiving pulses from St over a common line for convenience, the control circuit St acts to separately influence delay devices T1 and T2. In the preferred embodiment herein T2 limits the response of M1 to photodiodes $a$–$f$ to a period corresponding to a few cycles of output of generator G. During this time period, the light beam fluctuates more or less around the mean value of the measurement, depending upon the properties of the circuit device being measured. Thereby, none, one or several photo elements $a$ to $f$ will be contacted or passed over by the light beam, and such facts will be determined by the measuring system M1 and stored therein.

After the time delay provided by the device T2 has expired, the delay member T3 is deactuated and this has the effect of disconnecting the device being measured P from the measuring mechanism Mw, so that the light beam can return to its starting position at increased speed. This fast return has the advantage that only a short time is required for the process. Moreover, fast rising and falling edges of the pulses from the photo elements $g$ to $m$ are provided, thereby resulting in better formed signals for further processing operations.

In addition after the time delay T2 has expired, the measuring circuit M1 is deactivated to prevent it from receiving signals from photodiodes $a$–$f$, although measuring circuit M2 is active allowing it to receive signals from photodiodes $g$–$m$ as the light beam is returning to the rest position. During the period M1 was active it received and stored pulses from photodiodes $a$–$f$, and upon deactivation of M1 in the above described manner this information is transmitted to control circuit St via the lead therebetween shown in the drawing. During the period of activity of M2, after T2 has expired, signals from all of the actuated photodiodes $g$–$m$ are not transmitted to St; only signals from photodiodes $g$–$m$ are transmitted from those of said diodes which have a predetermined relationship with the limiting values of the measuring value fluctuations.

For the present example, it will be assumed that the only measuring values which are to be considered are those which lie below the range on scale Sk of the fluctuations of the measuring value. For this purpose, the measuring system M1 includes means (not shown) which will disconnect the limiting value indicators of the second group, which correspond to the actuated photo elements of the first group. As a result, the disconnected photo elements can no longer provide pulses to the measuring apparatus, so that only pulses of the photo elements which are not disconnected are used to transmit the digital value of the characteristic being measured. For example, if the light beam had actuated photo diodes $d$ and $e$ in its fluctuations, the corresponding diodes $h$ and $i$ will be in effect disconnected by the measuring system M1 so that only pulses from diodes $j$, $k$, $l$ and $m$ can be emitted. The respective groups $a$–$f$ and $g$–$m$ of the photodiodes are each shown to be connected in common for convenience to measuring circuits M1 and M2, respectively, but it is to be understood that M1 and M2 have the capability of determining from which of the photodiodes a pulse is emanating or which of said diodes is to be deactivated.

It should be appreciated, however, that the first emitted digital value can have a different dependence upon the measuring value fluctuations. For example, the upper, the lower or an intermediate limiting value can be provided for emission of the first digital pulse, through a corresponding connotation at the measuring systems M1, M2.

After the light beam again passes over the photo element $o$ the entire measuring system is brought to a standstill by the control system St. Then an evaluation system Aw is actuated in correspondence to the number of digital pulses received. This actuation then controls removal of the examined item from the receiver P. Moreover, in the event a sorting system is connected to the measuring apparatus, the device measured can be classified into a corresponding group of circuit devices in accordance with the number of digital pulses received. This sorting operation can be carried out not only in accordance with the magnitude of the digital value itself, but also in accordance with the extent of fluctuation around the mean value of the measurement.

The evaluation system Aw can also control additional signal apparatus, for example to sound an alarm in the case a defective circuit device is detected. Also, by operation of appropriate lamps, indication can be made of the group into which the measured circuit devices have been sorted.

It will be understood that a number of changes, in addition to those specifically indicated above, can be made in the illustrative embodiment of the invention, without departure from its scope. Accordingly, the invention is not to be considered to be limited to the embodiment described specifically herein, but rather only by the scope of the appended claims.

What I claim is:

1. Apparatus for measuring the electrical characteristics of circuit devices in response to changes in a parameter of the electrical signal applied thereto, said characteristics including fluctuations in the electrical value of a parameter of the output signal from said device, comprising:

a measuring instrument for providing a measurement of said parameter of said output signal, said instrument having an indicator movable along a scale in response to said value and a plurality of limiting value detectors spaced along the scale and dividing it into several ranges, the detectors being in position to be passed over by said indicator and responsive thereto to provide a signalling output, and measuring system means connected to said detectors, said detectors being formed into two groups separately connected to said measuring system means, one of said groups of detectors being adapted to detect the limits of the fluctuations of said parameter of said output signal and communicate said detected limits to said measuring system means, the other of said groups of detectors being adapted to respond to the limits detected by said one group to detect the value of said parameter of said output signal.

2. The apparatus of claim 1 in which the indicator is a light beam and said detectors are photo-sensitive devices.

3. The apparatus of claim 2 in which said instrument has a rest condition in which the light beam indicator is at one end of said scale, and in which said measuring system means is responsive to passage by the light beam over the photo-sensitive devices of said other group in return of the beam to its position to detect said electrical value.

4. The apparatus of claim 1 in which said detectors are arranged in spaced pairs of adjacent detectors, with one detector of each pair in said one group and the other detector in said other group.

5. The apparatus of either one of claims 3 and 4 in which said measuring system means includes means adapting said measuring system means to respond only to responses from detectors closer to said one end of the scale than those detecting the limits of said fluctuations, in detecting the limits of said fluctuations, in detecting said electrical value of said parameter of the output signal.

6. The apparatus of claim 1 including a first time delay device for preventing the measuring system from reacting to responses of said one group of detectors for a number of changes in said parameter of the applied electrical signal.

7. The apparatus of claim 6 including a second time delay device for preventing the measuring system from reacting to responses of said other group of detectors until determination of the limits of fluctuations by said one group of detectors.

8. The apparatus of any one of claims 3, 6 and 7 including a means connected between the device to be measured and said measuring instrument for disconnecting the two when said second group of detectors are detecting said electrical values.

9. The apparatus of any one of claims 1–4, 6 and 7 including an evaluation system connected to said measuring system means and responsive to at least one of the detections thereof to classify the circuit devices being measured.

References Cited

UNITED STATES PATENTS

| | | | |
|---|---|---|---|
| 2,660,077 | 11/1953 | Macaulay et al. | 250—230 UX |
| 2,779,728 | 1/1957 | Zinn et al. | 250—230 X |
| 3,271,677 | 9/1966 | Peter et al. | 324—97 X |
| 3,289,777 | 12/1966 | Willyard | 250—231 UX |
| 3,335,367 | 8/1967 | Skooglund et al. | 250—230 X |
| 3,337,739 | 8/1967 | Sendro | 250—231 |

EDWARD E. KUBASIEWICZ, Primary Examiner

U.S. Cl. X.R.

250—130; 324—97